United States Patent
McGinn

(10) Patent No.: US 7,236,756 B2
(45) Date of Patent: Jun. 26, 2007

(54) TUNING SIGNAL GENERATOR AND METHOD THEREOF

(75) Inventor: Michael McGinn, Tempe, AZ (US)

(73) Assignee: Freescale Semiconductors, Inc., Austin, TX (US)

( * ) Notice: Subject to any disclaimer, the term of this patent is extended or adjusted under 35 U.S.C. 154(b) by 364 days.

(21) Appl. No.: 10/319,188

(22) Filed: Dec. 13, 2002

(65) Prior Publication Data

US 2004/0116091 A1 Jun. 17, 2004

(51) Int. Cl.
*H04B 1/18* (2006.01)
*H04B 1/06* (2006.01)
*H04B 7/00* (2006.01)

(52) U.S. Cl. .............. 455/193.1; 455/150.1; 455/180.2; 455/189.1; 455/192.2

(58) Field of Classification Search ............. 455/193.1, 455/232.2, 183.1, 185.1, 186.1, 193.2, 193.3, 455/195.4, 198.1, 226.1, 194.1, 194.2, 196.1, 455/197.3, 199.1, 200.1, 192.1, 192.2, 192.3, 455/189.1, 191.1, 191.2, 232.1, 164.1, 164.2, 455/182.2, 182.3, 183.2, 254, 257, 264, 180.1, 455/188.1, 188.2, 197.1, 154.1, 340, 173.1, 455/178.1, 179.1
See application file for complete search history.

(56) References Cited

U.S. PATENT DOCUMENTS

| | | | | |
|---|---|---|---|---|
| 4,748,683 A | * | 5/1988 | Sato | 455/182.2 |
| 4,837,852 A | * | 6/1989 | Takada et al. | 455/193.3 |
| 5,280,638 A | * | 1/1994 | Porambo et al. | 455/143 |
| 5,428,829 A | * | 6/1995 | Osburn et al. | 455/197.1 |
| 5,678,211 A | * | 10/1997 | Badger | 455/191.1 |
| 5,701,598 A | * | 12/1997 | Atkinson | 455/161.2 |
| 5,991,609 A | * | 11/1999 | Marrah et al. | 455/182.2 |
| 6,157,271 A | * | 12/2000 | Black et al. | 332/127 |
| 6,178,315 B1 | * | 1/2001 | Sheikh-Movahhed et al. | 455/193.1 |
| 6,188,970 B1 | * | 2/2001 | Becker et al. | 702/106 |
| 6,243,570 B1 | * | 6/2001 | Kobayashi | 455/340 |
| 6,346,899 B1 | * | 2/2002 | Hadidi | 341/144 |
| 6,370,368 B1 | * | 4/2002 | Kianush | 455/264 |
| 6,424,824 B1 | * | 7/2002 | Stepp et al. | 455/197.3 |
| 6,842,610 B2 | * | 1/2005 | Maeda et al. | 455/260 |
| 2004/0033794 A1 | * | 2/2004 | Korden et al. | 455/197.1 |

* cited by examiner

*Primary Examiner*—Pablo N. Tran

(57) ABSTRACT

A front end tuning system includes a tuning signal generator. The tuning signal generator includes a digital-to-analog converter (DAC) to receive a pre-conditioned tuning signal at a reference input, to receive a digital value at a digital control input, and to produce a modified tuning signal based on the digital value and the pre-conditioned signal. Preconditioning the tuning-voltage allows a simple current type DAC to be can be used, rather than an 8-bit ladder type DAC used by some other front end tuners. Significant cost savings can be achieved because less memory is required to store the digital values supplied to the DACs, and set up times can be reduced. An adjustable temperature compensation circuit provides additional adaptability.

27 Claims, 4 Drawing Sheets

TUNING SIGNAL GENERATOR AND METHOD THEREOF

FIELD OF THE DISCLOSURE

This invention relates generally to generating a tuning signal, and more particularly to generating a tuning signal based on a conditioned tuning signal.

BACKGROUND

Radio receivers are generally understood to comprise a front end and a back end. The front end of the receiver selects a desired signal from among the many frequencies collected by the radio's antenna and converts the selected signal to an intermediate frequency (IF) signal that can be easily processed by the back end. The back end extracts information from the IF signal provided by the front end.

The process performed by the radio receiver's front end is loosely referred to as tuning the receiver, and can be broken down into three sub-functions: 1) generating a mixing signal; 2) selecting a desired radio signal by filtering; and 3) mixing the desired radio signal with the mixing signal to generate an IF signal. While various methods of performing each of the functions can be used, most modern radio receivers use automatic tuning systems as described below.

The local oscillator (LO) signal is a signal that has a frequency selected so that when the LO signal is combined with a selected radio signal, the selected radio signal is converted to an IF signal. The LO signal is generated as follows. A frequency synthesizer provides a tuning voltage, commonly referred to as a VCO tuning voltage, to a voltage controlled oscillator (VCO). The VCO generates the LO signal having a frequency dependent on the value of the VCO tuning voltage. The LO signal is fed back into the frequency synthesizer, which checks to see if the frequency of the LO signal is correct by comparing it to a reference frequency derived from an accurate crystal oscillator. If not, the frequency synthesizer changes the VCO tuning voltage to adjust the frequency of the LO signal. The frequency of the LO signal is again checked, and the VCO tuning voltage is altered as necessary. This process continues until the output of the VCO, the mixing signal, is locked onto the appropriate frequency.

The desired radio signal is selected using tunable filters. The tunable filters use varactor tuning diodes similar to those used in the VCO, and have frequency responses that can be changed by application of a filter tuning voltage. When an appropriate filter tuning voltage is applied to the front end filters' tuning diodes, the desired radio signal is passed through the front end and delivered to a mixer, along with the signal from the VCO. The mixer then combines the LO signal and the selected radio signal to generate a constant IF signal suitable for processing by the back end of the radio receiver.

In most conventional automatic front end tuners, the necessary filter tuning voltage provided to each front-end filter is generated by using an 8 bit multiplying digital-to-analog converter (DAC) to alter the VCO tuning voltage for use by a particular front end filter. The VCO tuning voltage (the same tuning voltage supplied to the VCO as discussed above) is provided to a reference input of the DAC, and a digital value corresponding to the frequency of the tuned radio signal is retrieved from a non-volatile memory and applied to a digital input of the DAC. The DAC then generates the required filter tuning voltage.

One limitation of the radios described above, is that for the DAC to provide the tuning voltages required by radios used in different international markets, the DAC must be capable of applying a large range of different gains to the VCO tuning voltage. The necessary range of gains is achieved by using a large number of digital values, which are stored in the radio's non-volatile memory. To provide the number of different digital values needed to achieve the necessary range of gains, each of the stored digital values is represented as an 8-bit number. Relatively large amounts of non-volatile memory are needed to store all of the required 8-bit numbers, and large memory requirements can significantly increase the manufacturing cost of radio receivers.

In addition to the cost of the memory itself, large amounts of production time are often needed to determine what the 8-bit digital values should be, and to store those digital values in the non-volatile memory. A system that reduces the number of bits required for operation of the DAC could result in a significant savings in production costs by limiting hardware costs and setup time.

BRIEF DESCRIPTION OF THE DRAWINGS

Various advantages, features and characteristics of the present disclosure, as well as methods, operation and functions of related elements of structure, and the combination of parts and economies of manufacture, will become apparent upon consideration of the following description and claims with reference to the accompanying drawings, all of which form a part of this specification.

DETAILED DESCRIPTION OF THE FIGURES

FIGS. 1–4 illustrate a radio front-end including a tuning signal conditioner that allows use of simplified digital-to-analog converters (DACs) according to various embodiments of the present disclosure. A frequency synthesizer or similar component supplies a tuning voltage to a voltage controlled oscillator (VCO) and to a tuning signal conditioner. The tuning signal conditioner applies an offset and gain to the input tuning voltage, thereby generating a conditioned tuning signal. The conditioned tuning signal is, in turn, supplied to a DAC, such as a current mode DAC, a current multiplying DAC, and a voltage DAC, which further modifies the conditioned tuning signal according to digital values retrieved from memory. The modified tuning signal produced by the DAC is delivered to a tunable circuit, such as an RF filter, that is used by the front end in selecting a desired radio signal such that the peak response and frequency of the front end tuned circuit corresponds to the frequency of the signal being received.

By conditioning the tuning signal before providing it to the DAC, the DAC does not require the full 8-bit data values required by DACs in many prior art radio front ends, and less complicated current multiplying DACs can be used in place of full 8-bit ladder type DACs. As a result, fewer bits of resolution mean that less non-volatile memory is required to store the digital values, production costs can be reduced, and setup times for the radio can be improved.

Figure 1:
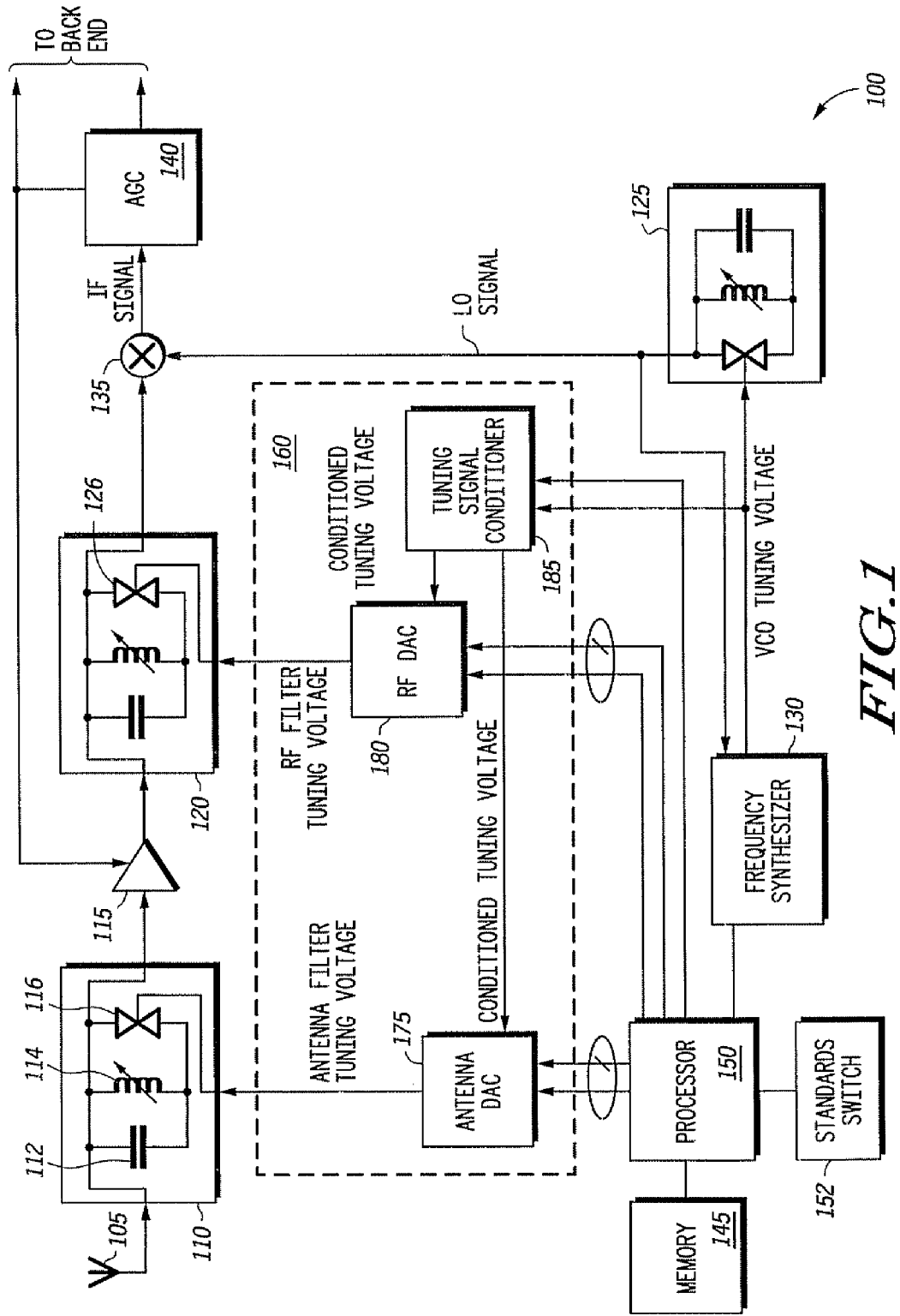
FIG. 1 is a combination block/schematic diagram illustrating a front-end tuning system according to an embodiment of the present disclosure.

Referring now to FIG. 1, a front-end tuner 100 employing a tuning signal generator according to an embodiment of the present disclosure will be discussed. Front-end Tuner 100 includes Antenna 105 having an output portion connected to First Stage Filter 110, which in turn is connected through Amplifier 115 to Second Stage Filter 120. Antenna 105 acts as a radio frequency (RF) signal source by receiving a broad range of RF signals including the FM broadcast band and providing the RF signal to the input of First Stage Filter 110. First Stage Filter 110, Amplifier 115 and Second Stage Filter 120 cooperate to selectively amplify a narrow band of frequencies centered about a desired FM station. The output of Second Stage Filter 120, along with the output from VCO 125, is provided to Mixer 135. Mixer 135 combines the filtered RF signal received from Second Stage Filter 120 with the LO signal from VCO 125 to produce a signal having information centered about a desired constant intermediate frequency (IF), and is used for processing by the remainder of the radio system (not shown). Automatic Gain Control 140 provides a feedback signal to Amplifier 115 based on the strength of the IF signal to increase or decrease the gain provided by Amplifier 115 such that the output of Mixer 135 is maintained at relatively constant amplitude.

The center frequency around which First Stage Filter 110 and Second Stage Filter 120 operate is determined by each filter's resonant frequency. For example, First Stage Filter 110 includes Capacitive Elements 112, Inductive Elements 114 and an automatically controllable tuning element such as Varactor 116. When the radio is tuned to a particular station, the frequency of First Stage Filter 110 and Second Stage Filter 120 are adjusted accordingly. This adjustment is accomplished by varying the tuning-voltage applied to Varactor 116 in First Stage Filter 110 and Varactor 126 in Second Stage Amplifier 120.

In one embodiment, the tuning-voltage applied to Varactors 116 and 126 is generated by Tuning Signal Generator 160 as follows. Processor 150 retrieves from Memory 145 a digital value that corresponds to the tuned station, and provides the digital value to both Antenna DAC 175 and RF DAC 180. Processor 150 also provides a control signal to Frequency Synthesizer 130, which generates a tuning control voltage that is supplied to both Voltage Controlled Oscillator (VCO) 125 and Tuning Signal Conditioner 185.

Note that Frequency Synthesizer 130 is part of a feedback loop including VCO 125 and a reference frequency, and that the control voltage supplied by Frequency Synthesizer 130 is continually adjusted until the output signal of VCO 125 reaches a desired frequency. The functions of Frequency Synthesizer 120 and VCO 125, as well as the basic operation of First Stage Filter 110, Amplifier 115, Second Stage Filter 120, Mixer 135 and AGC Circuitry 140 are well understood by those skilled in the art.

It will be appreciated that the tuning-voltages required by First Stage Filter 110 and Second Stage Filter 120 are related to, but different from, the tuning-voltage supplied to VCO 125. For example, the tuning-voltage supplied to VCO 125 in standard FM receivers in the United States ranges from approximately 2 volts to 5.5 volts. However, the tuning-voltages that must be supplied to First Stage Filter 110 and Second Stage Filter 120 typically range from 2 volts to 7.5 volts. Likewise the tuning-voltage supplied to VCO 125 in standard Japanese FM receivers is generally between 2 volts and 6 volts, whereas the tuning-voltages that must be supplied to First Stage Filter 110 and Second Stage Filter 120 in that same receiver typically needs to be in the 0.5 to 4 volt range.

Processor 150 is aware of the geographical location in which front end 100 is being used based on the setting of Standards Switch 152. In one embodiment, Standards Switch 152 is set during production of front end 100. However, in other embodiments Standards Switch 152 can automatically detect the geographic location based on the characteristics of received radio signals, or Standards Switch 152 can be configured for manual operation.

Processor 150 uses the setting of Standards Switch 152 to provide control signals and data to Tuning Signal Conditioner 185 and/or DACs 175 and 180. As described further with reference to FIG. 2, Processor 150 may control various switch settings and reference voltage levels in Tuning Signal Conditioner 185 to adjust the amount of gain and offset provided. Also, Processor 150 can assert or de-assert the most significant bit of DACs 175 and 180 as necessary to properly set their gains based on the radio transmission standards of the geographic area in which front end 100 is operating.

The DACs in conventional tuning-voltage generators require 8-bit digital values to produce the wide range of gains required by radios designed for use with different radio transmission standards. However, various embodiments of the present invention remove the need for DACs to provide a wide range of gains by conditioning tuning signals before they are received by the DACs. As a result of this preconditioning, DACs used in front end according to the present disclosure and do not require full 8-bit data values to properly modify the tuning signal for use with First Stage Filter 110 and Second Stage Filter 120.

Tuning Signal Conditioner 185 conditions the VCO tuning voltage received from Frequency Synthesizer 130 by applying a gain and an offset to the original VCO tuning signal before supplying the conditioned tuning signal to RF DAC 180 and Antenna DAC 175. With the bulk of any variable signal adjustments being made in Tuning Signal Conditioner 185, RF DAC 180 and Antenna DAC 175 need supply only relatively constant, minor gain adjustments to the conditioned signal.

Recall that a typical United States radio receiver operates using VCO tuning voltages in the range of 2 volts to 5.5 volts, and that Tuning Signal Generator 160 needs to produce a range of modified tuning voltages from 2 volts to 7.5 volts for use by First Stage Filter 110 and Second Stage Filter 120. By applying an offset of about −0.67 and a gain of about 1, Tuning Signal Conditioner 185 produces a conditioned signal in the range of 1.33 volts to 4.83 volts. In this example, RF DAC 180 and Antenna DAC 175 apply a digital value of about 0.76 to the conditioned signal, resulting in a signal having a range of between about 1. and 3.7. In at least one embodiment, Tuning Signal Generator 160 applies an additional gain of 2 to the signals generated by RF DAC 180 and Antenna DAC 175, resulting in modified signals having a range of between about 2 volts and 7.5 volts. The output of Antenna DAC 175 is provided to Varactor 116 to set the center frequency of Filter 110 and the output of RF DAC 180 is provided to Varactor 126 to set the center frequency of Second Stage Filter 120. Japanese, Eastern European, and other standards can be handled in a similar manner.

The above example is described in terms of voltages for ease of explanation however, the teachings set forth herein apply equally to current signals. Additionally, it will be appreciated by those skilled in the art that although only two DACs and two filters are illustrated in FIG. 1, Tuning Signal Conditioner 185 may supply a conditioned tuning voltage to any number of DACs for use by corresponding filters. For example, if a particular radio front end employs only a single filter, then only one DAC would be used. Likewise, if the radio front end included three filters, then three DACs could be used.

Figure 2:
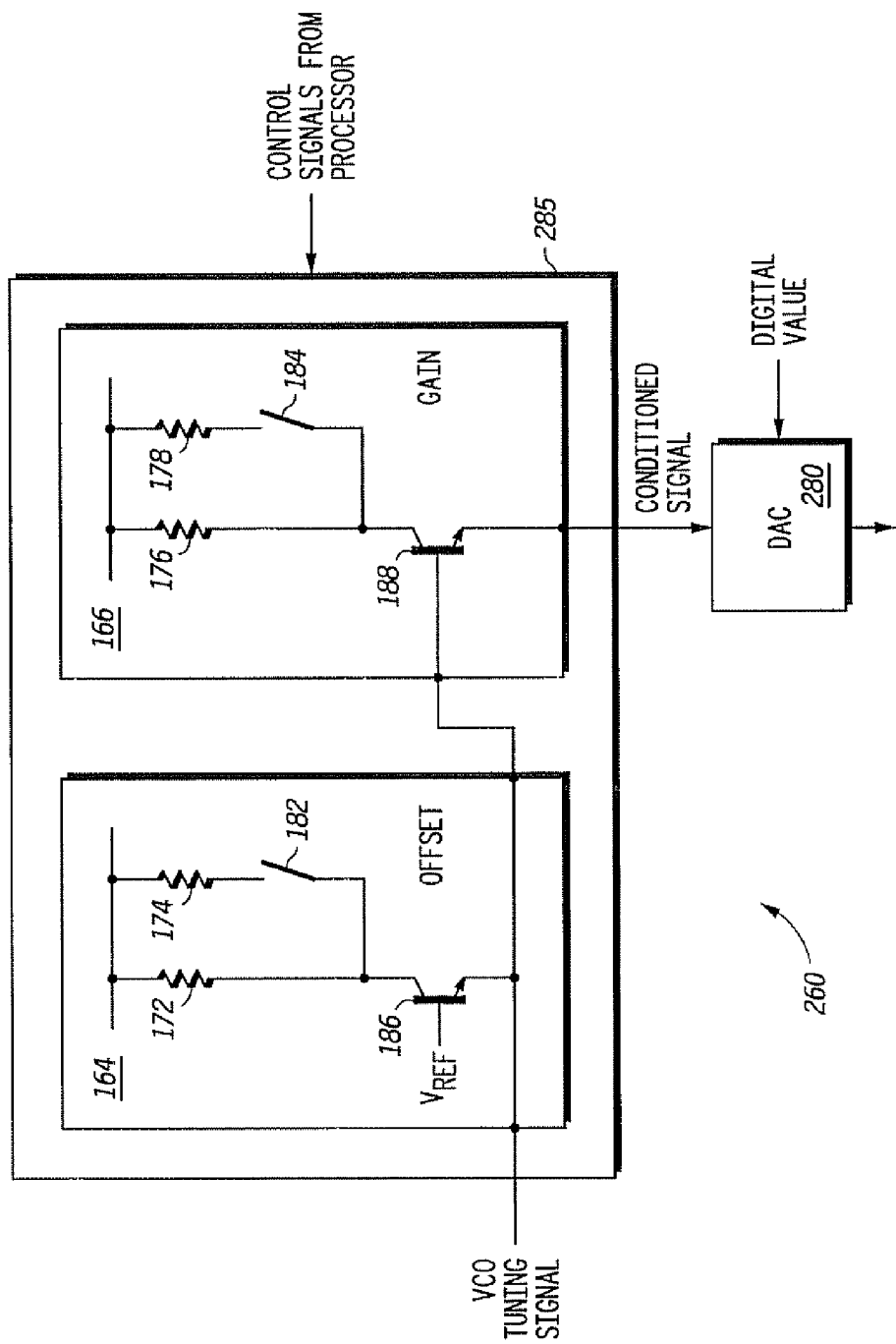
FIG. 2 is a combination block/schematic diagram illustrating a tuning-voltage generator according to an embodiment of the present disclosure.
Figure 4:
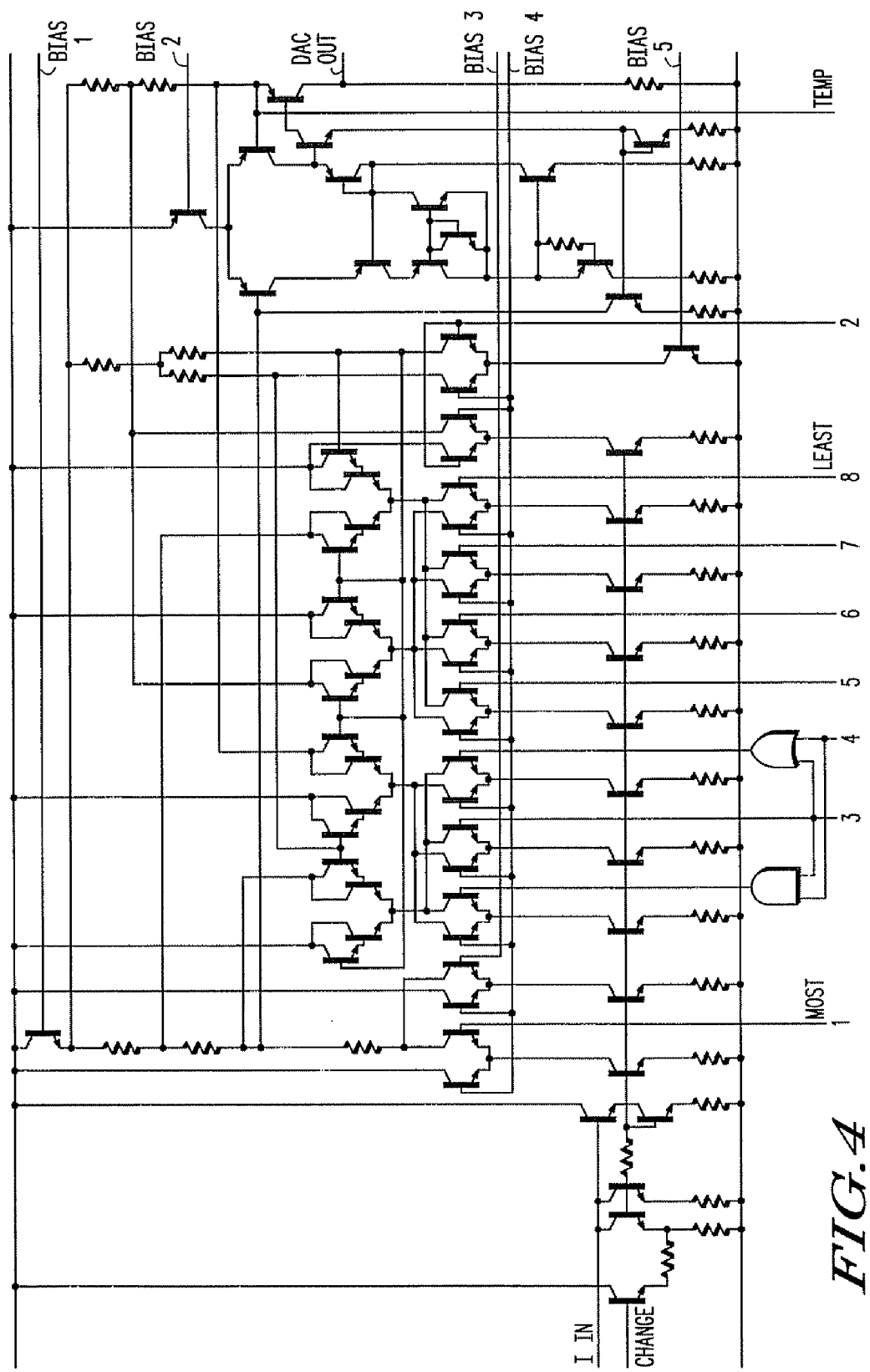
FIG. 4 illustrates a current multiplying digital to analog converter (DAC) according to an embodiment of the present disclosure.

Referring next to FIG. 2 the operation of a tuning signal generator according to an embodiment of the present disclosure will be further discussed. Reference numerals in FIG. 2 that are like, similar or identical to reference numerals in FIG. 1 indicate like, similar, or identical elements. Tuning Signal Generator 260 includes a Signal Conditioner 285 and a Digital to Analog Converter (DAC) 280. In at least one embodiment, DAC 280 is a current multiplying DAC rather than the straight, 8-bit ladder type DAC normally found in conventional systems. One embodiment of a current multiplying DAC, such as DAC 280, is illustrated in FIG. 4.

Still referring to FIG. 2, Tuning Signal Generator 260 includes Signal Conditioner 285. Signal Conditioner 285 includes a first input portion to receive control signals from a processor, such as processor 150 (FIG. 1), which can be used to control Offset Circuit 164 and Gain Circuit 166 as discussed subsequently. Signal Conditioner 285 includes a second input portion to receive a first tuning signal having a predetermined signal type, such as a United States type VCO tuning-voltage, a European type VCO tuning-voltage, a Japanese type VCO tuning-voltage, etc. Tuning Signal Generator 260 also includes an output connected to DAC 280 to provide DAC 280 with a conditioned signal having an offset and gain applied. DAC 280 includes an input connected to the output of Signal Conditioner 162, another input to receive a digital value, and an output to provide a modified tuning signal based on the conditioned tuning signal and the digital value.

Signal Conditioner 285 includes Offset Circuit 164 having an input connected to a reference input of the Signal Conditioner and an output connected to a gain circuit such as Gain Circuit 166. Gain Circuit 166 has an input connected to the output of Offset Circuit 164, and an output connected to the output of Signal Conditioner 162. As a result, the VCO tuning signal is passed through Offset Circuit 164, where an offset dependent on signal type is applied, and then into Gain Circuit 166 where a gain dependent on signal type is applied to the offset VCO tuning signal. The VCO tuning signal with the gain and the offset is provided as one of the inputs to DAC 280.

In the illustrated embodiment, Offset Circuit 164 includes a resistor network comprising Resistors 172 and 174. Switch 182 is controlled by the control signals from processor 150 (FIG. 1), and operates in conjunction with the resistor network to connect or disconnect Resistor 174 in parallel with Resistor 172. By setting the state of Switch 182 to either open or closed, the resistance value of the resistance network can be varied. Offset Circuit 164 further includes Transistor 186. The bias of Transistor 186 is controlled by a reference voltage (VREF), which can be set according to the control signals received from processor 150 (FIG. 1), or set during manufacturing depending on an intended operating location. When used in combination with the resistance network comprised of Resistors 172 and 174, Offset Circuit 164 applies a controllable offset to the VCO tuning signal. After leaving Offset Circuit 164 the offset VCO tuning signal proceeds to Gain Circuit 166.

Gain Circuit 166 includes a resistor network comprising Resistors 176 and 178 and Switch 184. The control signals received from processor 150 (FIG. 1) can control the state of Switch 184 to connect Resistor 178 in parallel with Resistor 176, thereby varying the resistance of the resistor network. Transistor 188 has a control node connected to receive the offset VCO tuning signal from Offset Circuit 164. As a result, Transistor 188 serves to apply a controllable gain to the offset VCO tuning signal such that the output of Gain Circuit 166 is a conditioned signal which is a representation of the original VCO tuning signal with an offset and gain applied.

The states of Switches 182 and 184 may be controlled based on the signal type of the VCO tuning signal. For example, in a United States standard radio receiver where the VCO tuning signal is of a United States signal type having a voltage range of 2 volts to 5.5 volts, Switches 182 and 184 can be left in the open state. As a result, the offset applied by Offset Circuit 164 may be, for example, −0.67 volts. Likewise, the gain applied by Gain Circuit 166 can be set to approximately 1 by leaving the Switch 184 in its open state. Conversely if the input VCO tuning signal is of a type used in Japan, Switches 182 and 184 may be closed, thereby varying the resistance value of the resistor network and providing different offsets and gains than when the switches are open. For example, when Switch 182 is in a closed state, the offset provided by Offset Circuit 164 may be 1.43 volts, and the gain supplied by Gain Circuit 166 may be 1.28. In this way, Signal Conditioner 285 can apply an offset and a gain to the input VCO tuning signal depending on the signal type of the VCO tuning signal. In this way, with the appropriate nominal setting of the DACs, the correct tuning voltage range can be provided to the front end tuned circuits, and the number of bits required for correct tuning can be minimized.

Figure 3:
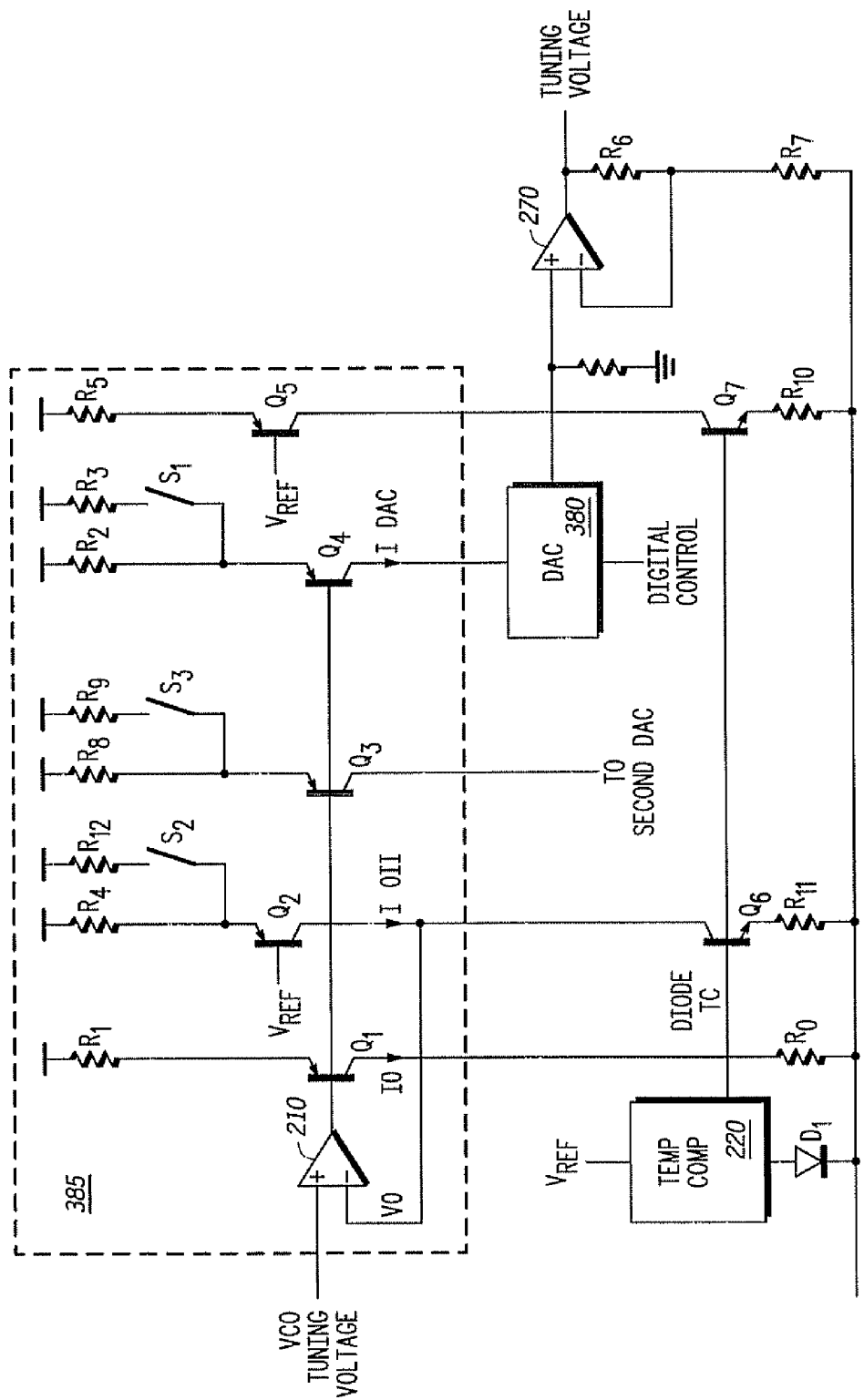
FIG. 3 is a combination block/schematic diagram illustrating a tuning-voltage generator according to another embodiment of the present disclosure.

Referring next to FIG. 3 another embodiment of a tuning signal generator will be discussed. Tuning Signal Generator 360 includes Tuning Signal Conditioner 285, DAC 380, Output Amplifier 270 and Temperature Compensation Circuit 220. Note that the illustrated embodiment shows only a single DAC 380 and corresponding Output Amplifier 270. However, Tuning Signal Generator 360 can be readily configured for use with a second DAC and corresponding output amplifier (not shown).

In operation, a VCO tuning-voltage is received at the input of Signal Conditioner 385 and delivered to Amplifier 210. Amplifier 210 is a unity gain amplifier, so V0 at the inverting input of Amplifier 210 is equal to VCO tuning voltage at the non-inverting input. The current in Q1 is set by R0 and the VCO tuning voltage, and the currents in Q2 and Q4 are proportional to the current through Q1. The offset circuit shown in Signal Conditioner 385, which functions as previously described with respect to FIG. 2 and comprises Resistor R4, R12 Switch S2 and Transistor Q2, is used to offset the current in Q1. There are two gain circuits shown in Signal Conditioner 285. One of the gain circuits comprises Resistors R8, R9, Switch S3 and Transistor Q3. This gain circuit is used to apply a gain to the offset VCO signal for use by a second DAC (not shown). The other gain circuit comprises Resistors R2, R3, Switch S1 and Transistor Q4. Both gain circuits function analogously to the circuit shown in FIG. 2. Note that Signal Conditioner 385 also includes Resistor R5 and Transistor Q5. These two components are used in conjunction with Transistor Q7 and Resistor R10 to add previously removed temperature compensation component to the output of DAC 380. Output Amplifier 270 has a gain determined by the ratio of Resistors R6 and R7, which are generally set equivalent to each other such that Output Amplifier 270 has a gain of 2.

In addition to the circuitry previously described, Temperature Compensation Circuit 220 and associated components are also shown in FIG. 3. It will be appreciated by those skilled in the art that the center frequency of tuned circuits can vary with changes in temperature. In order to ensure that tuned circuits such as VCO 125, First Stage Filter 110 and Second Stage Filter 120 (all shown in FIG. 1) are properly tuned, it may be advantageous to provide a temperature compensation circuit.

To provide temperature compensation, external Diode D1 is placed in close physical proximity to VCO 125 (FIG. 1) such that any temperature changes experienced by VCO 125 will also be experienced by external Diode D1. One node of external Diode D1 is connected to Temperature Compensation Circuit 220 to provide a measure of how much temperature compensation to apply to Varactors 116 and 126 (FIG. 1). In at least one embodiment, Temperature Compensation Circuit 220 provides variable current that can be controlled to alter the amount of temperature compensation provided by Temperature Compensation Circuit 220.

It will be appreciated that the VCO tuning voltage will change as the temperature changes. The output of Temperature Compensation Circuit 220 is used to bias Transistors Q6 and Q7 to compensate for changes in the VCO tuning voltage with temperature. Transistor Q6 is used in conjunction with the offset circuitry to apply an offset proportional to a change in temperature, thereby removing any change in the VCO tuning voltage that occurs due to a change in temperature. The proportional offset used to remove the change in the VCO tuning voltage due to temperature, is applied to the VCO tuning voltage before the offset and gain adjusted signal is applied to DAC 380. Transistor Q7 is used in conjunction with Transistor Q5 to add back an amount of current that cancels out the effects of changes in tuning due to changes in temperature of front end tuning diodes (see 116, 126 in FIG. 1). This is necessary because applying the temperature changes in VCO tuning voltage to the front end tuned circuits (FIG. 1) after scaling the VCO tuning voltage would result in errors in front end tuned circuit temperature compensation. In at least one embodiment, the amount of current added back in is equal and opposite to the amount of current removed by transistor Q6. Note that the temperature compensation provided by Temperature Compensation Circuit 220 can be adjusted, or even turned off if so desired.

FIG. 4 illustrates Current Multiplying DAC 480, which is used in various embodiments as taught herein, which can be used as DAC 280. It will be appreciated that the conditioned signal to the DAC 280 of FIG. 2 would be received at the node labeled Iin at the left side of FIG. 4; the digital value to the DAC 280 is received at the numbered nodes (1–8) near the bottom of FIG. 4; and the output of DAC 280 is at then node marked DAC OUT. The node labeled TEMP can be used for temperature compensation. The node labeled CHANGE is used for temperature compensation. Node BIAS1 is used for biasing current summing resistors. Node BIAS2 is for biasing current source. Node BIAS3 is used to provide a reference voltage for the second most significant differential switch. Node BIAS4 is used as a reference voltage for the six least significant differential switches. Node BIAS5 is used for biasing a current source Those skilled in the art will appreciate that while a particular DAC configuration is illustrated in FIG. 4, other suitable configurations may be employed without departing from the spirit and scope of the present disclosure. Note that, since all 8 bits of resolution required by conventional multiplying DACs are not required when implementing the teachings set forth herein, the most significant bit need not be stored in memory 145 (FIG. 1) but instead may be switched by standards switch 152 (FIG. 1). Additionally, the value second most significant bit can be fixed internally in the DAC as a one, and the external value of the second most significant bit can be used as a sign bit. In this way, Current Multiplying DAC 480 can be used to correct tuning-voltage deviations caused by component tolerances adding or subtracting small amounts from a nominal gain, using only the least significant bits. Because only the least significant bits are used for correction, good monoticity can be maintained.

In summary, a tuning-voltage is provided to a tuning signal conditioner where an offset and gain are applied to produce a conditioned tuning signal. The conditioned tuning signal is, in turn, provided to a digital-to-analog converter (DAC) for use in generating a modified tuning signal. The DAC receives the conditioned tuning signal at a reference input, receives a digital value at a digital control input, and produces an output signal based on the digital value and the conditioned signal. This output can be provided to a varactor or other suitable tuning element in order to control the frequency response of a filter or other similar circuit.

By preconditioning the tuning-voltage before supplying it to the digital to analog converter, the DAC is not required to apply a wide range of gains in order to generate an appropriate modified tuning signal. Instead, less than 8 bits of resolution are required and simpler current type DACs can be used in place of more complex 8-bit ladder multiplying DACs. By reducing the number of bits of resolution required, cost savings can be achieved because less memory is required to store the digital values supplied to the DACs. In addition, cost savings can be achieved during the manufacturing process because of reduced set up times. Finally, adjustable temperature compensation provides extra adaptability to a tuning signal generator as taught herein.

In the preceding detailed description of the figures, reference has been made to the accompanying drawings, which form a part thereof, and in which is shown by way of illustration specific embodiments in which the disclosure may be practiced. These embodiments are described in sufficient detail to enable those skilled in the art to practice the disclosure, and it is to be understood that other embodiments may be utilized and that logical, mechanical, chemical, and electrical changes may be made without departing from the spirit or scope of the disclosure. For example, bipolar junction transistors have been illustrated in various figures, but other transistor types, such as field effect transistors and the like, may be used as desired.

Furthermore, many other varied embodiments that incorporate the disclosure may be easily constructed by those skilled in the art. For example, the embodiments discussed above show a resistor network used in conjunction with a mechanical switch to vary the amount of gain and offset applied to a tuning signal. Other switch types, including transistor switches or any other suitable type of switch may be used in place of mechanical switches, and/or the resistor networks shown may be replaced by variable resistance. To avoid detail not necessary to enable those skilled in the art to practice the invention, the description may omit certain information known to those skilled in the art. Accordingly, the present disclosure is not intended to be limited to the specific form set forth herein but on the contrary, it is intended to cover such alternatives, modifications, and equivalents, as can be reasonably included within the spirit and scope of the invention. The preceding detailed description is, therefore, not to be taken in a limiting sense, and the scope of the present disclosure is to be defined only by the appended claims.

What is claimed is:

1. A device comprising:
   a signal conditioner comprising an input to receive a first tuning signal, and an output to provide a conditioned tuning signal, said conditioned tuning signal being a representation of the first tuning signal having an offset and a gain applied based on a transmission standard associated with the first tuning signal; and
   a digital-to-analog converter comprising a reference input coupled to said output of said signal conditioner to receive said conditioned tuning signal, a data input to receive a digital value, and an output to provide a modified tuning signal based on said conditioned tuning signal and said digital value.

2. The device as in claim 1, wherein said signal conditioner further comprises:
   an offset circuit comprising an input coupled to said first input of said signal conditioner, and an output to provide an offset tuning signal; and
   a gain circuit having an input coupled to said output of said offset circuit to receive said offset tuning signal, and an output coupled to said output of said signal conditioner to provide said conditioned tuning signal.

3. The device as in claim 2, wherein said offset circuit further comprises:
   a resistor network comprising:
      a first resistor having a first node coupled to a supply, and a second node;
      a second resistor having a first node coupled to said supply, and a second node;
      a switch having a first side coupled to said second node of said second resistor and a second side coupled to said second node of said first resistor; and
   a transistor comprising:
      a first current electrode coupled to said second node of said first resistor;
      a second current electrode coupled to said input of said output of said offset circuit; and
      a control node coupled to a reference voltage.

4. The device as in claim 2, wherein said gain circuit further comprises:
   a resistor network comprising:
      a first resistor having a first node coupled to a supply, and a second node;
      a second resistor having a first node coupled to said supply, and a second node;
      a switch having a first terminal coupled to said second node of said second resistor and a second side coupled to said second node of said first resistor; and
   a transistor comprising:
      a first current electrode coupled to said second node of said first resistor;
      a second current electrode coupled to said output of said gain circuit; and
      a control node coupled to said input of said gain circuit.

5. The method as in claim 1, wherein the digital value is represented using less than 8 bits.

6. The device as in claim 1, wherein said digital-to-analog converter is a current mode digital-to-analog converter.

7. The device as in claim 1, further comprising a temperature compensation circuit.

8. The device as in claim 7, wherein said temperature compensation circuit further comprises:
   an input to receive a signal indicative of an amount of temperature compensation applied to the first tuning signal;
   a first output coupled to said input of said signal conditioner to apply a first offset proportional to a temperature change of the device, to said first tuning signal; and
   a second output coupled to said output of said digital to analog converter to apply a second offset, proportional to a temperature change of the device, to said modified tuning signal, said second offset equal and opposite to said first offset.

9. The device as in claim 1, further comprising a bandpass filter, said bandpass filter comprising:
   a first input to receive an RF signal;
   a second input coupled to said output of said digital-to-analog converter to receive said modified tuning signal;
   a tunable circuit element coupled to said second input to adjust a resonant frequency of said bandpass filter; and
   an output to provide a filtered signal having a center frequency corresponding to the resonant frequency of said bandpass filter.

10. The device as in claim 1, further comprising:
    a processor coupled to said data input of said digital-to-analog converter to provide said digital value; and
    a memory coupled to said processor, said memory to store bit values associated with said digital value.

11. A method comprising:
    receiving a first tuning signal;
    altering the first tuning signal to generate a conditioned tuning signal, wherein the conditioned tuning signal has been offset and amplified relative to the first tuning signal based upon a transmission standard associated with the tuning signal;
    providing the conditioned tuning signal to an input of a digital-to-analog converter; and
    providing a digital value to a digital input of the digital-to-analog converter such that the digital-to-analog converter produces a modified tuning signal based on the conditioned tuning signal and the digital value.

12. The method as in claim 11, wherein altering the first tuning signal further comprises altering a resistance value of an offset circuit.

13. The method as in claim 11, wherein altering the first tuning signal further comprises altering a resistance value of a gain circuit.

14. The method as in claim 11, wherein altering the first tuning signal further comprises setting a switch state based on the transmission standard associated with the tuning signal.

15. The method as in claim 11, wherein the digital value is represented using less than 8 bits.

16. The method as in claim 11, wherein the digital-to-analog converter is a current mode digital to analog converter.

17. The method as in claim 11, further comprising:
    receiving a signal indicative of an amount of temperature compensation applied to the first tuning signal;
    applying a first offset to the first tuning signal proportional to the amount of temperature compensation applied; and
    applying a second offset to the modified signal, the second offset being equal and opposite to the first offset.

18. The method as in claim 11, further comprising providing the modified tuning signal to a tunable RF filter.

19. A device comprising:
    a signal conditioner comprising an input to receive a first tuning signal having a signal type, and an output to provide a conditioned tuning signal, the conditioned tuning signal being a representation of the first tuning signal having an offset and a gain applied based on the signal type of the first tuning signal;

a digital-to-analog converter comprising a reference input coupled to the output of the signal conditioner to receive the conditioned tuning signal, a data input to receive a digital value, and an output to provide a modified tuning signal based on the conditioned tuning signal and the digital value; and a temperature compensator comprising:
   a first output coupled to said input of said signal conditioner to apply a first offset proportional to a change in temperature to said first tuning signal, said first tuning signal being adjustable based on the change in temperature;
   a second output coupled to said output of said digital to analog converter to apply a second offset to said modified tuning signal, said second offset equal and opposite to said first offset.

20. The device as in claim 19, wherein said signal conditioner further comprises:
   an offset circuit comprising an input coupled to said input of said signal conditioner and an output to provide an offset tuning signal; and
   a gain circuit having an input coupled to said output of said offset circuit to receive said offset tuning signal, and an output coupled to said output of said signal conditioner to provide said conditioned tuning signal.

21. The device as in claim 20, wherein said offset circuit further comprises:
   a resistor network comprising:
      a first resistor having a first node coupled to a supply, and a second node;
      a second resistor having a first node coupled to said supply, and a second node;
      a switch having a first side coupled to said second node of said second resistor and a second side coupled to said second node of said first resistor;
   a transistor comprising:
      a first current electrode coupled to said second node of said first resistor;
      a second current electrode coupled to said input of said output of said offset circuit; and
      a control node coupled to a reference voltage.

22. The device as in claim 20, wherein said gain circuit further comprises;
   a resistor network comprising:
      a first resistor having a first node coupled to a supply, and a second node;
      a second resistor having a first node coupled to said supply, and a second node;
      a switch having a first side coupled to said second node of said second resistor and a second side coupled to said second node of said first resistor;
   a transistor comprising:
      a first current electrode coupled to said second node of said first resistor;
      a second current electrode coupled to said output of said gain circuit; and
      a control node coupled to said input of said input of said gain circuit.

23. The method as in claim 19, wherein the digital value is represented using less than 8 bits.

24. The device as in claim 19, wherein said digital-to-analog converter is a current mode digital-to-analog converter.

25. The device as in claim 19, further comprising a temperature compensation circuit.

26. The device as in claim 19, further comprising a bandpass filter, said bandpass filter further comprising:
   a first input to receive an RF signal;
   a second input coupled to said output of said digital-to-analog converter to receive said modified tuning signal;
   a tunable circuit element coupled to said second input to adjust a resonant frequency of said bandpass filter; and
   an output to provide a filtered signal having a center frequency corresponding to the resonant frequency of said bandpass filter.

27. The device as in claim 19, further comprising:
   a processor coupled to said control input of said digital-to-analog controller to provide said digital control signal; and
   a memory coupled to said processor, said memory to store bit values associated with said digital control signal.

* * * * *